United States Patent [19]

Delpretti

[11] 4,262,185

[45] Apr. 14, 1981

[54] EDM PROCESS AND APPARATUS FOR MACHINING A WORKPIECE BY MEANS OF A WIRE ELECTRODE

[75] Inventor: Roger Delpretti, Vernier, Switzerland

[73] Assignee: Ateliers des Charmilles S.A., Geneva, Switzerland

[21] Appl. No.: 26,447

[22] Filed: Apr. 2, 1979

[30] Foreign Application Priority Data

Apr. 10, 1978 [CH] Switzerland .......................... 3821/78

[51] Int. Cl.³ ............................................. B23P 1/02
[52] U.S. Cl. ............................... 219/69 W; 219/69 M
[58] Field of Search ................ 219/69 W, 69 M, 69 P

[56] References Cited

U.S. PATENT DOCUMENTS 4,052,583  10/1977  Inoue ................................ 219/69 W

FOREIGN PATENT DOCUMENTS 505550  9/1976  U.S.S.R. ................................ 219/69 W

Primary Examiner—C. C. Shaw
Attorney, Agent, or Firm—Hauke and Patalidis

[57] ABSTRACT

An EDM process and apparatus for effecting a cut in an electrode workpiece by means of an electrode tool wire, wherein consecutive current pulses are caused to flow through a machining gap between the electrode wire and the workpiece, and the electrode wire is maintained under traction in the machining zone and is displaced longitudinally and fed laterally through the machining zone. The electrical resistance of the wire is measured through the portion of the wire disposed in the machining zone, and the machining current or the force stretching the wire by exerting a traction thereon, or both, is adjusted such as to maintain the electrical resistance within a predetermined range. This adjustment insures a continuous control of the mechanical and thermal constraints exerted on the electrode wire as well as preventing rupture of the wire.

12 Claims, 2 Drawing Figures

EDM PROCESS AND APPARATUS FOR MACHINING A WORKPIECE BY MEANS OF A WIRE ELECTRODE

BACKGROUND OF THE PRESENT INVENTION

The present invention relates to a method and to an apparatus for cutting by electrical discharges an electrode workpiece by means of an electrode tool in the form of a wire, in the course of which electrical discharges are applied across the electrodes and the electrodes are fed relative to each other according to a programmed cutting path, the electrode wire being longitudinally displaced through the machining zone by being subjected to a predetermined pull between two guide members.

As is the case in all EDM machines, the speed of feed of the electrode tool into the workpiece is adjusted such as to maintain a predetermined electrical discharge gap between the electrode wire and the workpiece. The machine performances with respect to precision and speed of machining are limited by the mechanical and thermal loads which can safely be applied to the electrode wire. The pulling force applied on the wire influences its position between the wire guide members and consequently the accuracy of machining, more particularly during changes in the direction of the cutting path and in the optimum cutting speed, and the permissible pulling force is closely related to the intensity of the current which may flow through the wire without causing rupture of the wire. It is therefore important to control with accuracy the physical state of the wire at all times, such as to apply through the wire a current of an intensity compatible with the force of traction exerted on the wire, or vice versa.

It is known, for example, to adjust the traction exerted on the wire as a function of the elongation of the wire under traction, but such a method is not very precise and does not take into consideration the heat expansion of the wire.

The principal object of the invention is to utilize a characteristic magnitude representative of the physical state of the wire which permits to control both the mechanical and thermal stress of the wire, such as to obtain an automatic regulation of the machining current or of the force exerting a pull on the wire during machining, or of both. The characteristic magnitude is the ohmic resistance of the wire which varies both as a function of the machining current and as a function of the traction exerted on the wire. It has been observed that the limit of the force of traction causing rupture of the wire varies as a function of the current intensity, and that this limit causing rupture of the wire corresponds to values of the wire electrical resistance which are within a very narrow range. Maintaining the electrical resistance of the wire below a predetermined value permits to avoid rupture of the wire.

SUMMARY OF THE INVENTION

The present invention accomplishes its objects by providing a method and apparatus for measuring the electrical resistance of the wire electrode of an EDM machine in the machining zone formed by the wire electrode in conjunction with the workpiece, and in varying the machining current or the amount of traction exerted on the wire, or both, as a function of the measured electrical resistance, such as to maintain the electrical resistance of the electrode wire within a predetermined range.

In this manner, an adaptive adjustment of the machining current and of the traction exerted on the electrode wire is obtained which permits to achieve an optimized machining efficiency while preventing rupture of the electrode wire during machining.

BRIEF DESCRIPTION OF THE DRAWING

The drawing illustrates, by way of example, an example of structure for practicing the method of the present invention. In the drawing.

DETAILED DESCRIPTION OF THE PREFERRED EMBODIMENT

Figure 1:
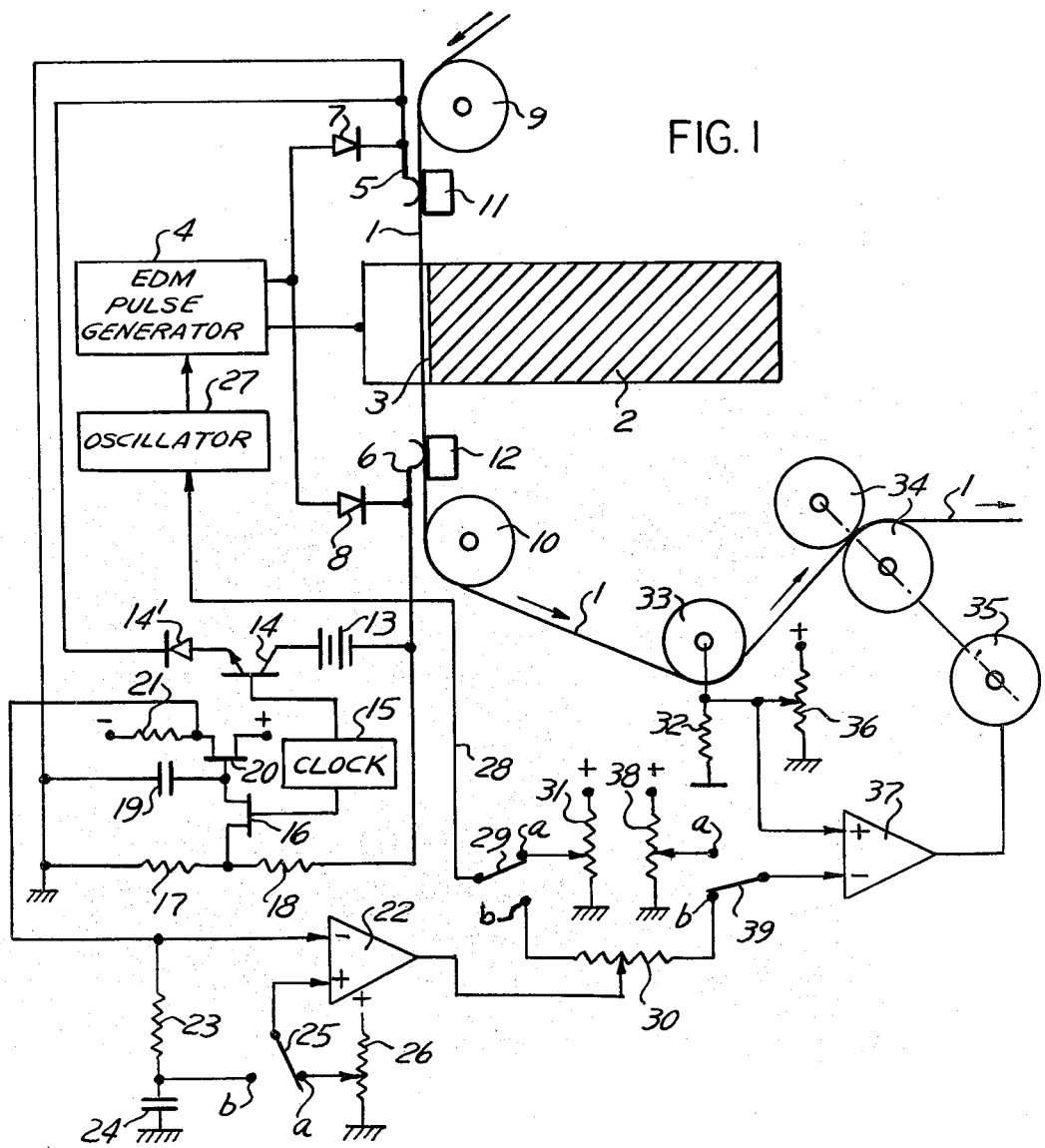
FIG. 1 is an example of an electrical schematic for adjusting the electrical resistance of an electrode wire according to the invention.

Referring to FIG. 1, an EDM machine is illustrated comprising an electrode wire 1 effecting a cut on a workpiece 2 by means of electrical discharges occurring across a machining gap 3 through which an appropriate dielectric fluid, not shown, is circulated. The electrical discharges are supplied by a pulse generator 4 having a terminal connected to a pair of sliding contacts 5 and 6 through, respectively, diodes 7 and 8, and another terminal connected to the workpiece 2. The electrode wire 1 obtained from a supply spool, not shown, is fed longitudinally by pulleys 9 and 10 and is in sliding engagement with guiding surfaces 11 and 12. The electrode wire 1 and the workpiece 2 are displaced relative to each other according to a programmed cutting path, the means for controlling the cutting path relative translation are well known and not illustrated in the drawing.

The electrical resistance of the wire 1 is measured on its length between the sliding contacts 5 and 6. The circuit measuring the electrical resistance of the electrode wire comprises a DC source 13 connected across the sliding contacts 5 and 6 through the emitter-collector circuit of a transistor 14 and through a diode 14'. The conductance of the emitter-collector circuit of the transistor 14 is controlled by pulses applied to the base of the transistor and obtained from a pulse generator or clock 15. The measuring circuit further comprises a field-effect (FET) transistor 16 controlled by the clock 15 and connected across the common terminal of a pair of voltage-divider resistors 17 and 18 and the common terminal of one of the plates of a capacitor 19 and the base of a second FET transistor 20. The remaining terminal of the resistor 17 is connected to the other plate of the capacitor 19 and to the sliding contact 5 in engagement with the electrode wire 1. The remaining terminal of the resistor 18 is connected, through the sliding contact 6, to the electrode wire 1.

The emitter-collector circuit of the FET transistor 20 is connected across a voltage source through a series resistor 21. The voltage across the resistor 21 is applied both to an input of a differential amplifier 22 and to the input of a circuit consisting of a resistor 23 and a capacitor 24 connected in series. The other input of the differential amplifier 22 may be connected through a double-pole switch 25 either to the slider of a potentiometer 26 through contact a of the switch or, through contact b, to the common junction between the resistor 23 and the capacitor 24.

The transistor 14, while in the conducting state, causes a short duration pulse of constant current to flow through the electrode wire 1. During the occurrence of such a pulse, the FET transistor 16 is also in its conducting state, and the capacitor 19 is charged to a voltage which is proportional to the voltage drop between the sliding contacts 5 and 6. During the time interval between two consecutive pulses, the transistors 14 and 16 are non-conductive, and the voltage across the capacitor 19 is stored until the next current pulse. The voltage across the resistor 21, which is the same as the voltage across the capacitor 19, is proportional to the electrical resistance of the electrode wire 1.

The resistance of the electrode wire 1 could also be measured by passing a steady direct current through the wire. However, by using a current pulse, the intensity, or amplitude, of the measuring current may have an average value which is negligible relative to that of the machining current provided by the EDM pulse generator 4. The EDM pulse generator 4 provides machining pulses at a frequency determined by the adjustment of pilot oscillator 27 which is controlled by a signal applied through a line 28. The EDM pulse generator 4 and the pilot oscillator circuit 27 are well known in EDM technology. The line 28 is connected to the output of the differential amplifier 22 through a section of a potentiometer 30 and the terminal b of a double-pole switch 29. The terminal a of the switch 29 is connected to the slider of a potentiometer 31. The clock 15 is capable of being synchronized with the operation of the oscillator 27, such that the resistance of the electrode wire is measured during the off interval between two consecutive electrical discharges.

The value of the force of traction exerted on the electrode wire 1 is measured by means of a spring 32 pulling on a pulley 33 placed between the wire pulley 10 and the electrode wire drive pinch rollers 34 driven by an electric motor 35. Displacement of the pulley 33, under the pulling action of the spring 32, displaces the slider of a potentiometer 36, the position of the slider varying as a function of the elongation of the electrode wire 1 due to the traction exerted on the electrode wire by the spring 32 through the pulley 33. The voltage picked by the slider of the potentiometer 36 is applied to an input of a differential amplifier 37, whose other input is connected through a double-pole switch 39 either to the end of the potentiometer 30 which is connected to the terminal b of the switch, or to the slider of a potentiometer 38, through the terminal a of the switch.

The voltage level appearing at the output of the differential amplifier 22 is the function of the difference between the voltage drop through the electrode wire 1 and a reference voltage supplied at the slider of the potentiometer 26 when the movable contact of the switch 29 is engaged with its stationary contact corresponding to its terminal a. When the movable contact of the switch 29 is engaged with its fixed contact b, the reference voltage corresponds to the average value of the voltage drop across the electrode wire 1, and the signal at the output of the differential amplifier 22 varies as a function of the instantaneous real time variation of the resistance of the electrode wire.

Figure 2:
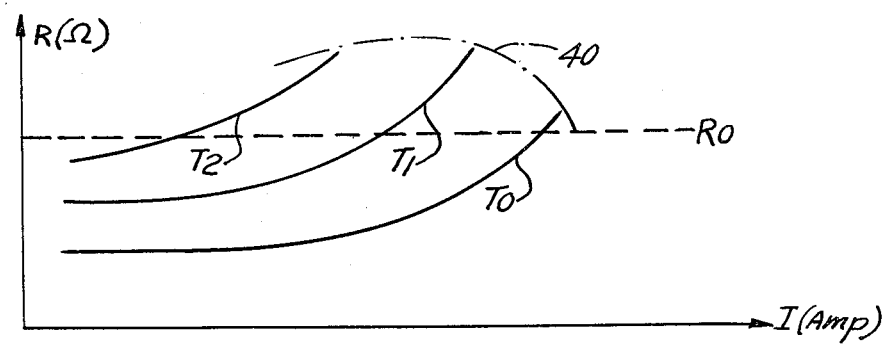
FIG. 2 is a graph illustrating the variation of electrical resistance of the electrode wire as a function of the machining current and of the force of traction exerted on the wire.

The arrangement of FIG. 1 permits a choice of mode of operation among several which are available, according to the position of the movable contact of the switches 29 and 39. As illustrated in the diagrams of FIG. 2, it is possible to maintain the resistance of the electrode wire at a predetermined value by acting respectively on the machining current and on the force of traction exerted on the electrode wire. Curves $T_0$, $T_1$ and $T_2$ correspond respectively to arbitrarily chosen increasing values of the force of traction. The dot-and-dash curve 40 represents the envelope of the value limits causing rupture of the wire.

By placing the movable contact of the switch 29 in engagement with its contact or terminal a, and the movable contact of the switch 39 in engagement with its contact b, the electrical resistance of the electrode wire is adjusted to a value $R_o$ as a result of adjusting the value of the force of traction applied to the wire for a given machining current as determined by the setting of the potentiometer 31.

On the other hand, if the movable contact of the switch 29 is engaged with its contact b, and the movable contact of the switch 39 is engaged with its contact a, the resistance of the electrode wire is maintained constant to the value $R_o$, FIG. 2, as a result of adjusting the frequency of the machining pulses, that is the average machining current.

In both cases, rupture of the electrode wire can be avoided because the horizontal straight line $R_o$ of FIG. 2 is below the curve 40 representing the limits causing rupture of the wire. Another mode of operation consists in connecting the movable contacts of the switches 29 and 39 through their respective contacts b, such as to adjust simultaneously the traction exerted on the wire and the frequency of the electrical discharges in response to the difference between the resistance of the wire and the resistance reference value. Such a setup permits to adjust the resistance of the electrode wire with a minimum of variation of the machining current.

A further mode of operation consists of adjusting the resistance of the electrode wire to a value which varies substantially as a function of the current or of the amount of the pull exerted on the wire, such that the curve defining the limit of the resistance of the wire is parallel and below the curve 40 of FIG. 2. The signal at the input of the differential amplifier 22 can thus be used to indicate a faulty contact between the electrode wire 1 and the sliding contacts 5 and 6, or in the alternative, rupture of the electrode wire.

Having thus disclosed the present invention by way of a particular structural embodiment thereof, modification whereof will be apparent to those skilled in the art, what is claimed as new is as follows:

1. In a process for machining by electrical discharges an electrode workpiece by means of an electrode wire, wherein electrical machining current in the form of consecutive electrical discharges from a current source are applied between said electrodes, said electrodes are displaced one relative to the other according to a cutting path through said electrode workpiece and said electrode wire is fed longitudinally through a machining zone defined between said electrodes by being subjected to a predetermined traction force, wherein said machining current is supplied to said electrode wire by a pair of sliding contacts such that the active portion of said electrode wire is disposed in the machining zone between said contacts, the improvement comprising measuring the electrical resistance of the active portion of said electrode wire in the machining zone between said contacts, and varying the machining current as a function of said electrical resistance such as to maintain said electrical resistance within a predetermined range.

2. An apparatus for machining by electrical discharges an electrode workpiece by means of an electrode wire, wherein electrical machining current in the form of consecutive electrical discharges from a first current source are applied between said electrodes, said electrodes are displaced one relative to the other according to a cutting path through said electrode workpiece and said electrode wire is fed longitudinally through the machining zone defined between said electrodes by being subjected to a predetermined traction force, said apparatus comprising a pair of sliding contacts in engagement with said electrode wire for applying said machining current to said electrode wire such that the active portion of said electrode wire is disposed in the machining zone between said contacts, a second current source connected across said contacts, means for measuring the voltage drop resulting from passage of current from said second source between said sliding contacts, and means for varying said machining current as a function of the difference between said voltage drop and a reference voltage.

3. The apparatus of claim 2 wherein said second current source provides consecutive pulses of constant current amplitude, and said voltage drop between said sliding contacts is measured during the passage of said pulses.

4. The apparatus of claim 2 further comprising means for determining the average value of said voltage drop during a predetermined time interval, and means for converting said average value to said reference voltage.

5. In a process for machining by electrical discharges an electrode workpiece by means of an electrode wire, wherein electrical machining current in the form of consecutive electrical discharges from a current source are applied between said electrodes, said electrodes are displaced one relative to the other according to a cutting path through said electrode workpiece and said electrode wire is fed longitudinally through a machining zone defined between said electrodes by being subjected to a predetermined traction force, wherein said machining current is supplied to said electrode wire by a pair of sliding contacts such that the active portion of said electrode wire is disposed in the machining zone between said contacts, the improvement comprising measuring the electrical resistance of said electrode wire in the machining zone between said contacts, and varying the traction force exerted on the electrode wire as a function of said electrical resistance such as to maintain said electrical resistance within a predetermined range.

6. An apparatus for machining by electrical discharges an electrode workpiece by means of an electrode wire, wherein electrical machining current in the form of consecutive electrical discharges from a first current source are applied between said electrodes, said electrodes are displaced one relative to the other according to a cutting path through said electrode workpiece and said electrode wire is fed longitudinally through the machining zone defined between said electrodes by being subjected to a predetermined traction force, said apparatus comprising a pair of sliding contacts in engagement with said electrode wire for applying said machining current to said electrode wire such that the active portion of said electrode wire is disposed in the machining zone between said contacts, a second current source connected across said contacts, means for measuring the voltage drop resulting from passage of current from said second source between said sliding contacts, and means for varying said traction force exerted on the electrode wire as a function of the difference between said voltage drop and a reference voltage.

7. The apparatus of claim 6 wherein said second current source provides consecutive pulses of constant current amplitude, and said voltage drop between said sliding contacts is measured during the passage of said pulses.

8. The apparatus of claim 6 further comprising means for determining the average value of said voltage drop during a predetermined time interval, and means for converting said average value to said reference voltage.

9. In a process for machining by electrical discharges an electrode workpiece by means of an electrode wire, wherein electrical machining current in the form of consecutive electrical discharges from a current source are applied between said electrodes, said electrodes are displaced one relative to the other according to a cutting path through said electrode workpiece and said electrode wire is fed longitudinally through a machining zone defined between said electrodes by being subjected to a predetermined traction force, wherein said machining current is supplied to said electrode wire by a pair of sliding contacts such that the active portion of said electrode wire is disposed in the machining zone between said contacts, the improvement comprising measuring the electrical resistance of said electrode wire in the machining zone between said contacts, and varying the machining current and the traction force exerted on the electrode wire as a function of said electrical resistance such as to maintain said electrical resistance within a predetermined range.

10. An apparatus for machining by electrical discharges an electrode workpiece by means of an electrode wire, wherein electrical machining current in the form of consecutive electrical discharges from a first current source are applied between said electrodes, said electrodes are displaced one relative to the other according to a cutting path through said electrode workpiece and said electrode wire is fed longitudinally through the machining zone defined between said electrodes by being subjected to a predetermined traction force, said apparatus comprising a pair of sliding contacts in engagement with said electrode wire for applying said machining current to said electrode wire such that the active portion of said electrode wire is disposed in the machining zone between said contacts, a second current source connected across said contacts, means for measuring the voltage drop resulting from passage of current from said second source between said sliding contacts, and means for varying the machining current and said traction force exerted on the electrode wire as a function of the difference between said voltage drop and a reference voltage.

11. The apparatus of claim 10 wherein second current source provides consecutive pulses of constant current amplitude, and said voltage drop between said sliding contacts is measured during the passage of said pulses.

12. The apparatus of claim 10 further comprising means for determining the average value of said voltage drop during a predetermined time interval and means for converting said average value to said reference value.

* * * * *

UNITED STATES PATENT AND TRADEMARK OFFICE
CERTIFICATE OF CORRECTION

PATENT NO. : 4,262,185
DATED : April 14, 1981
INVENTOR(S) : Roger Delpretti

It is certified that error appears in the above—identified patent and that said Letters Patent are hereby corrected as shown below:

```
Col. 2, line 69, change "a" to --a--,
                 change "b" to --b--.
Col. 3, line 29, change "b" to --b--,
        line 30, change "a" to --a--,
        line 29, change "double-pole" to --single pole
                 double throw--,
        line 48, change "double-pole" to --single pole
                 double throw--,
        line 50, change "b" to --b--,
        line 51, change "a" to --a--.
Col. 4, line 10, change "a" to --a--,
        line 12, change "b" to --b--,
        line 18, change "b" to --b--,
        line 19, change "a" to --a--,
        line 29, change "b" to --b--.

Col. 2, lines 66, 67, "double-pole" should read
        -- single pole double throw --.
```

Signed and Sealed this

Twenty-ninth Day of September 1981

[SEAL]

Attest:

Attesting Officer

GERALD J. MOSSINGHOFF

Commissioner of Patents and Trademarks